United States Patent
Laville et al.

(10) Patent No.: US 8,346,982 B2
(45) Date of Patent: Jan. 1, 2013

(54) VIDEO DETECTION CELL FOR A SET TOP BOX

(75) Inventors: Sébastien Laville, Shenzhen (CN); Jean-Marc Merval, Veurey-Voroize (FR)

(73) Assignee: STMicroelectronics S.A., Montrouge (FR)

( * ) Notice: Subject to any disclaimer, the term of this patent is extended or adjusted under 35 U.S.C. 154(b) by 1326 days.

(21) Appl. No.: 11/956,390

(22) Filed: Dec. 14, 2007

(65) Prior Publication Data

US 2008/0148337 A1    Jun. 19, 2008

(30) Foreign Application Priority Data

Dec. 14, 2006  (FR) ...................................... 06 55500

(51) Int. Cl.
*G06F 3/00* (2006.01)
*H04N 7/16* (2006.01)

(52) U.S. Cl. .................. 710/8; 710/15; 710/52; 725/143

(58) Field of Classification Search .................. None
See application file for complete search history.

(56) References Cited

U.S. PATENT DOCUMENTS

| 5,815,088 | A | 9/1998 | Kurtz |
| 6,600,521 | B1 * | 7/2003 | Smith ........................... 348/730 |
| 7,793,317 | B2 * | 9/2010 | Sullivan et al. .................. 725/14 |
| 2002/0124266 | A1 * | 9/2002 | Blanchard ..................... 725/130 |

FOREIGN PATENT DOCUMENTS

| DE | 19957679 A1 | 6/2001 |
| EP | 0507433 A1 | 7/1992 |
| EP | 0598448 A1 | 5/1994 |
| EP | 1045584 A2 | 10/2000 |
| GB | 2246048 A | 1/1992 |
| GB | 2411064 A | 8/2005 |

OTHER PUBLICATIONS

French Search Report from corresponding French Application No. 06/55500, filed Dec. 14, 2006.

* cited by examiner

*Primary Examiner* — Alan Chen
(74) *Attorney, Agent, or Firm* — Wolf, Greenfield & Sacks, P.C.

(57) ABSTRACT

A switch for switching video signals in a set top box between a first interface for connecting the set top box to a television, a second interface for connecting the set top box to a video playback device, and decoding circuitry for decoding a video stream, the set top box including a processor having a low power mode in which the decoding circuitry is inactive, the switch including detection circuitry arranged to detect, while the processor is in the low power mode, activity on a video input line of one of the first and second interfaces, and arranged to output an activation signal to switching circuitry in the switch to activate a loop through between the first and second interfaces when activity is detected.

24 Claims, 4 Drawing Sheets

VIDEO DETECTION CELL FOR A SET TOP BOX

BACKGROUND OF THE INVENTION

1. Field of the Invention

The present invention relates to a video detection cell having loop through functionality, and in particular to a video detection cell for sensing activity on a video line.

2. Discussion of the Related Art

Set top boxes are devices known in the art that can be connected to a television or other display monitor, and allow digital images to be viewed. In particular, a set top box comprises a microprocessor having a decoder for decoding a digital data stream, which is for example received by a cable connection, telephone line, network connection, or satellite. Such set top boxes generally comprise an interface for connecting to a television, which may be, for example, a SCART (Peritel) connection, and usually comprise further interfaces for interconnecting with other devices such as video cassette recorders, hard-disk recorders and DVD players/recorders, which may also be SCART connections.

The set top box may act as a routing means for connecting the television to these further devices, which are generally not connected to the television directly. Thus often, when using one of these devices, for example playing back a DVD or recording a video program to video cassette, the set top box itself is used solely for providing the interconnection, and not for decoding data. This function is known in the art as loop through. However, in order that such a box can provide loop through functionality, it is necessary for the set top box, and in particular the microprocessor, to be activated. This is disadvantageous for a number of reasons, for example due to the relatively high power that this consumes.

SUMMARY OF THE INVENTION

It is an aim of embodiments of the present invention to provide a set top box that at least partially overcomes the disadvantages of prior set top boxes.

According to a first aspect of the present invention, there is provided a switch for switching video signals in a set top box between a first interface for connecting said set top box to a television, a second interface for connecting said set top box to a video playback device, and decoding circuitry for decoding a video stream, said set top box comprising a processor having a low power mode in which said decoding circuitry is inactive, the switch comprising detection circuitry arranged to detect, while said processor is in said low power mode, activity on a video input line of one of said first and second interfaces, and arranged to output an activation signal to switching circuitry in said switch to activate a loop through between the first and second interfaces when activity is detected.

According to one embodiment of the present invention, the detection circuitry is arranged to output said activation signal to activate a loop through from said first interface to said second interface when activity is detected on a video input line of said first interface, and to output said activation signal to activate a loop through from said second interface to said first interface if activity is detected on a video input line of said second interface.

According to one embodiment of the present invention, the activation signal is coupled to activate at least one input and/or output buffer of said switching circuitry coupled to one of said first and second interfaces.

According to one embodiment of the present invention, the detection circuitry comprises timing circuitry arranged to provide said activation signal if an active signal is regularly detected on said video input line during a first determined time period.

According to one embodiment of the present invention, the detection circuitry further comprises delay circuitry arranged to introduce a delay after detection of one active signal on said video input line before a next active signal on said video input line can be detected, wherein said timing circuitry is arranged to provide said activation signal if a determined number of said active signals are received during said first determined time period.

According to another aspect of the present invention, there is provided a set top box comprising an integrated circuit comprising decoding circuitry for decoding a digital video stream; a first interface for connecting the set top box to a television; a second interface for connecting the set top box to a video playback device; and the above switch.

According to another aspect of the present invention, there is provided a method of activating a loop through between a first interface and a second interface of a set top box, said first interface for connecting said set top box to a television and said second interface for connecting said set top box to a video playback device, said set top box comprising decoding circuitry for decoding a video stream, and a switch for switching video signals between said decoding circuitry and the first and second interfaces, the method comprising monitoring, when a processor of said set top box is in a low power mode in which said decoding circuitry is inactive, a video input line of said first and second interfaces; and providing an activation signal to switching circuitry of said switch to implement loop through between said first and second interfaces if activity is detected on said video input line.

According to one embodiment of the present invention, the step of providing an activation signal comprises providing an activation signal to implement loop through from said first interface to said second interface if activity is detected on a video input line of said first interface, and providing an activation signal to implement loop through from said second interface to said first interface if activity is detected on a video input line of said second interface.

According to one embodiment of the present invention, activity is detected on said video input line if a voltage level above a determined threshold is detected repeatedly within a determined period of time.

According to one embodiment of the present invention, when it is determined that the low power mode is to be entered and prior to entering the low power mode, controlling by said processor video switches in said switching circuitry to be configured for loop through between said first and second interfaces, and activating by said activation signal at least one input and/or output buffer of said switching circuitry to implement said loop through.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 1:
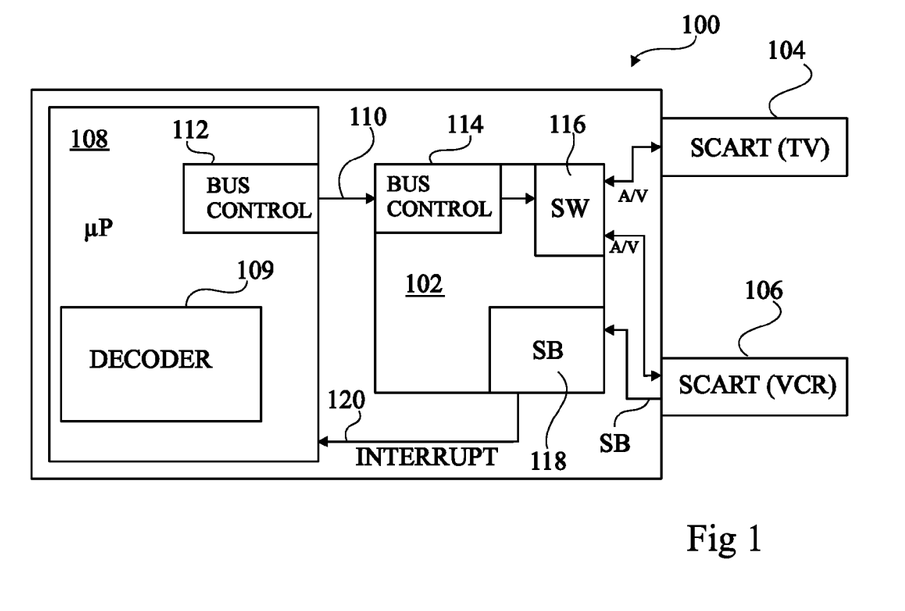
FIG. 1 illustrates schematically a proposed loop through mechanism.

FIG. 1 illustrates a set top box 100, comprising a multimedia switch 102, and in particular a multimedia switch that has loop through functionality according to one proposed design. As illustrated, switch 102 is connected to a first SCART connection 104, and a second SCART connection 106, which respectively allow the set top box to be connected to a television and a VCR.

The set top box further comprises a microprocessor 108, comprising a decoder 109, which receives and decodes the data streams, received for example via cable, satellite, or network interfaces not shown in FIG. 1. Microprocessor 108 is connected to switch 102 via a bus connection 110, and the microprocessor 108 and the multimedia switch 102 each comprising a bus control logic block, 112 and 114 respectively, for controlling communication via the bus 110.

Multimedia switch 102 comprises a switching block SW, labelled 116, and a slow blanking block SB, labelled 118.

Multimedia switch 102 allows video and audio signals originating from, in this example, the television, the VCR or the decoder to be switched and provided as outputs to the television or VCR. Assuming that a user wishes to play back a video cassette via the VCR, the decoder 109 is not required to decode the digital streams, and may be deactivated. The set top box, and in particular the multimedia switch 102 then performs a loop through, connecting SCART connection 106 of the VCR to SCART connection 104 of the television.

In order to allow this functionality, it is proposed that a signal SB (slow blanking) is provided by the VCR to the SCART connection 106, to indicate that a video signal is going to be sent. As illustrated in FIG. 1, signal SB is provided to a slow blanking monitoring circuit 118 in the multimedia switch 102, which then generates an interrupt signal to the microprocessor 108, on line 120. If microprocessor 108 was in a standby mode, this activates the microprocessor, and in any case the microprocessor 108 responds by providing control signals via bus 110 to the multimedia switch 102. The signals are received via bus control logic 114 in the multimedia switch 102, and then control switches 116 to perform the loop through between SCART 106 and SCART 104. In particular, switches 116 are controlled to allow audio and video signals to pass from VCR 106 to television 104.

This proposed solution has disadvantages, as when activating the microprocessor 108, power is consumed, and furthermore, as televisions are generally not able to provide a slow blanking SB, this solution does not allow loop through to be provided automatically from a television to a VCR, if for example it is desired to record to video cassette a television program received by the television.

Figure 2:
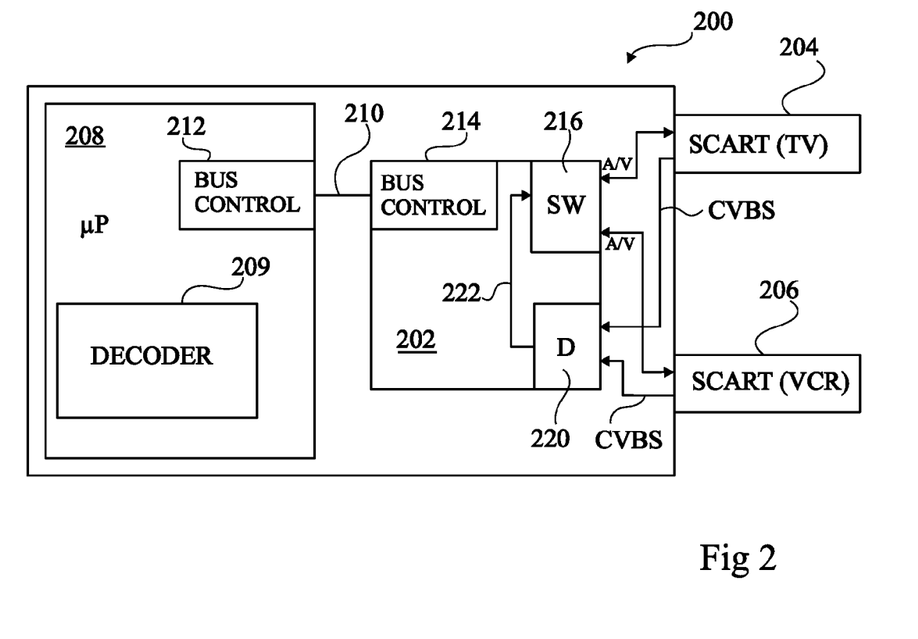
FIG. 2 illustrates schematically a set top box comprising a loop through mechanism which has a video detection cell according to one embodiment of the present invention.

FIG. 2 illustrates a set top box 200 comprising a multimedia switch 202. As with switch 102, switch 202 allows connection between a first SCART input 204 and a second SCART input 206, SCART input 204 for example being connected to a television and SCART input 206 for example being connected to a VCR. The television could be any type of display, including an LCD (liquid crystal display) or PDP (plasma display panel). In alternative embodiments, SCART input 206 could be connected to alternative video recording devices, such as a hard disk drive recorder or DVD recorder.

Set top box 200 also comprises a microprocessor 208 having a decoder 209 for decoding digital data streams received by cable, satellite or network interfaces (not shown in FIG. 2). Microprocessor 208 can communicate with switch 202 via a bus 210, and the microprocessor 208 further comprises bus control logic 212 which communicates with bus control logic 214 in multimedia switch 202 via bus 210.

Switch 202 further comprises switches 216 and a video detection cell 220, which will be described in more detail below.

Switch 202 is arranged to allow any of the inputs from decoder 209, SCART connection 204 and SCART connection 206 to be connected to the output pins of the SCART connection 204 or SCART connection 206. Furthermore, when the television and VCR are used independently of the set top box 200, set top box 200 can act as a connection means for connecting between the television and VCR, by performing a loop through. According to this embodiment, rather than relying on a slow blanking signal, determination of whether or not a loop through is required is achieved by sensing for the presence of an active signal on a video input line of the television SCART input 204 or the VCR SCART input 206. In the present embodiment, the video input corresponds to a CVBS (Composite Video, Blanking and Sync) signal. As illustrated in FIG. 2, the CVBS signal from each SCART inputs 204, 206 is provided to detection block 220. Detection block 220 monitors these inputs, and when it detects an active signal on either input it provides an output on a line 222 to the switch block 216 in order to activate the necessary switches for performing the loop through.

According to one embodiment, the loop through can thus be performed without activating the microprocessor 208. Thus, when the microprocessor 208 is in a low power mode in which it consumes very little or no power, loop through may be automatically implemented without activating the microprocessor. The low power mode for example corresponds to the mode when the set top box is switched off. Preferably, prior to entering the low power mode, microprocessor 208 controls multimedia switch 202 to be correctly configured for providing the loop through between SCART 204 and SCART 206. Furthermore, before entering the low power mode, microprocessor 208 activates the detection circuit 220 to monitor the signals on the CVBS video inputs from each SCART connection. Thus, when the microprocessor 208 enters the low power mode, it can be detected automatically that a loop through is required, and the circuitry in block 216 can be activated accordingly, without activating the microprocessor 208.

Figure 3:
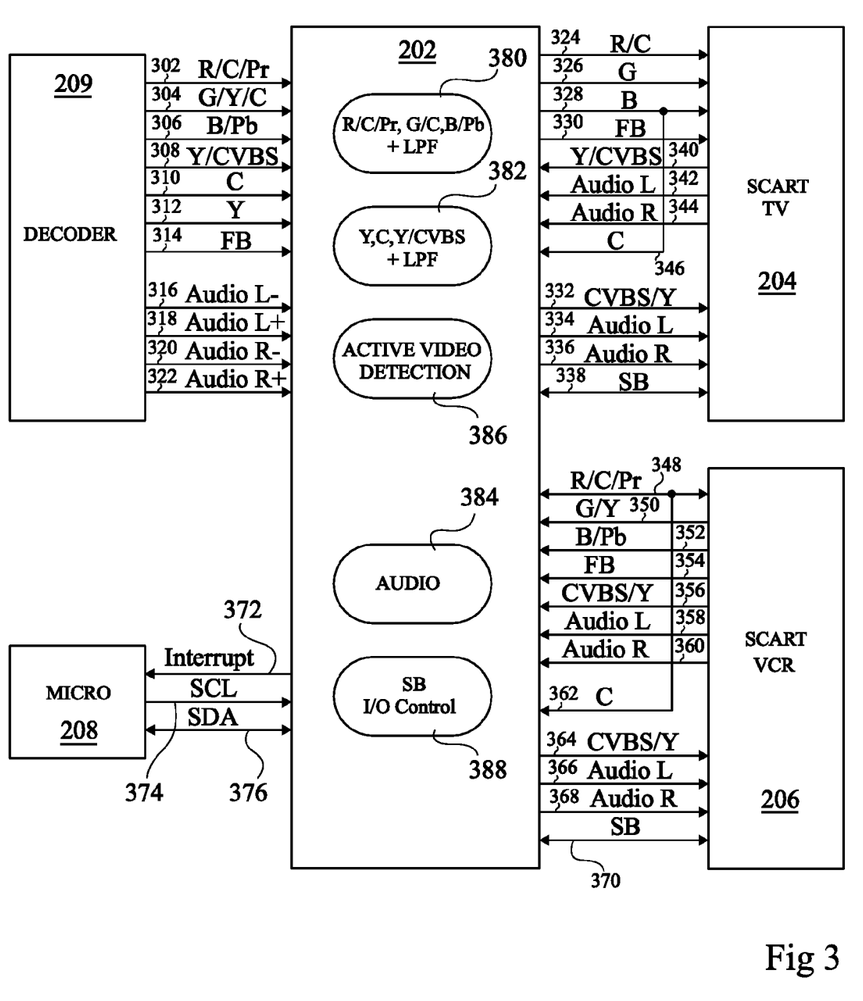
FIG. 3 illustrates schematically the multimedia switch of FIG. 2 in more detail.

FIG. 3 is a schematic diagram illustrating connections to switch 202 in more detail. As shown, switch 202 is connected to a first television SCART connection 204, a second VCR SCART connection 206, a microprocessor 208 and to a decoder 209, which is implemented by the microprocessor in the present example. Decoder 209 provides video signals to switch 202 in component video format on three lines 302, 304 and 306, these lines for example comprising RGB (Red, Green, Blue) signals, or PrYPb signals. These lines may also transmit luminance (Y) or chroma (C) signals. The decoder also provides a video input on line 308 to the switch 202 containing luminance (Y) or CVBS signals. Lines 310 and 312 provide chroma (C) and luminance (Y) signals respectively to the switch 202 from decoder 209, and line 314 provides a fast blanking signal (FB). Fast blanking for example allows additional information to be displayed by the television. Lines 316, 318, 320 and 322 from decoder 209 to switch 202 provide negative and positive left audio and negative and positive right audio respectively.

The switch 202 provides component video (RGB) outputs to SCART 204 on lines 324, 326 and 328. Line 324 may also provide a chroma (C) output. A fast blanking (FB) output is provided on line 330 to SCART 204. Furthermore, switch 202 provides a composite video CVBS signal on line 332 to SCART 204, and left and right audio on lines 334 and 336. A slow blanking line 338 is provided between switch 202 and SCART 204. However, generally televisions are unable to provide a slow blanking signal. Switch 202 also receives an input from SCART 204 including a composite video input on line 340, left and right audio on lines 342 and 344 respectively, and a chroma (C) input on line 346, which is connected to blue (B) input line 328.

In a similar fashion, SCART 206 receives and provides signals to switch 202. In particular, component video is received from the VCR on lines 348, 350 and 352, in the form of RGB or Pr/Y/Pb, and fast blanking (FB) is received on lines 354. A composite video signal CVBS is provided on lines 356 to switch 202, and left and right audio signals provided on lines 358 and 360 respectively. Switch 202 provides outputs to SCART 206 including a chroma output (C) on line 362, a composite video CVBS on line 364, and left and right audio signals on lines 366 and 368. Slow blanking (SB) to and from SCART 206 is provided on line 370.

Inputs and outputs are provided for transmitting and receiving signals to and from microprocessor 208, including an interrupt signal on line 372 to the microprocessor, a bus clock signal SCL on line 374 from microprocessor 208, and a data signal SDA to and from the microprocessor 208 on line 376.

Switch 202 comprises circuitry and logic for providing the interconnections between the decoder, SCART 204, SCART 206 and the microprocessor. In particular, switch 202 includes switching circuitry 380 for switching the component video signals, switching circuitry 382 for switching the luminance, chrominance and composite video signals, and audio switches 384 for switching the audio signals. Switching circuitry 380 and 382 also comprises low pass filters for filtering the input signals. Switch 202 further comprises active video detection block 386 which performs a function of detecting for activity on the CVBS inputs from SCART 204 and from SCART 206, in this example on lines 340 and 356 respectively. If activity is detected on these lines, it is determined that loop through functionality is required. Switch 202 further comprises a slow blanking control block 388.

Figure 4:
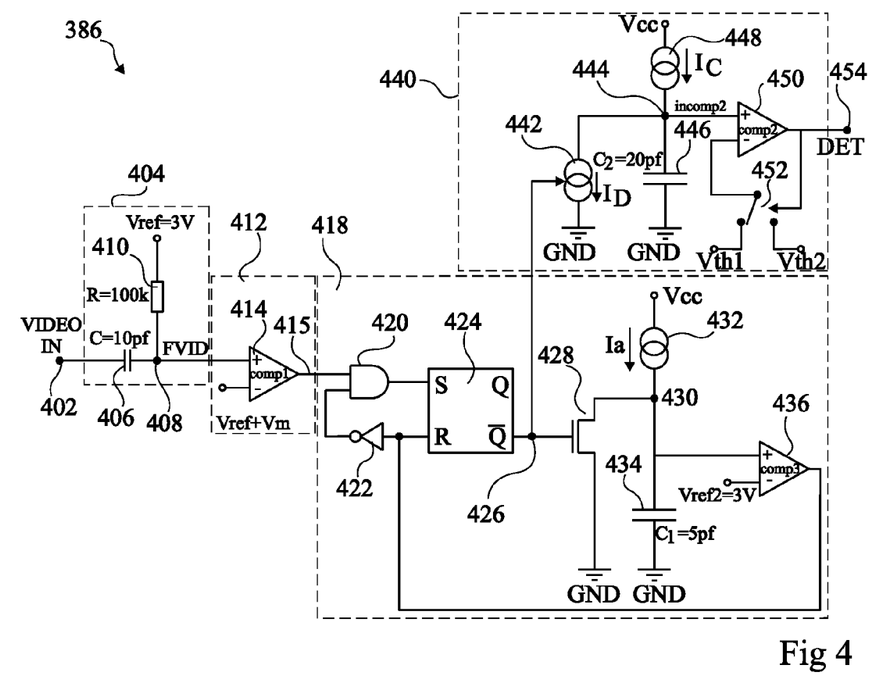
FIG. 4 illustrates schematically a video detection cell according to an embodiment of the present invention.

FIG. 4 illustrates the active video detection circuitry 386 of FIG. 3 in more detail.

With reference to FIG. 4, circuitry 386 comprises a video input 402, which as discussed above is connected in this example to input lines 340 and 352. This allows the detection circuit 386 to detect the presence of a signal at these inputs, and activate the loop through functionality accordingly. It should be noted that in this embodiment these input lines may also receive luminance (Y) signals, and the detection circuitry 386 can also be activated by a luminance signal. In alternative embodiments, other video signals provided on other input lines could be used for detecting and activating the loop through functionality.

According to one embodiment, the detection circuitry 386 is not only arranged to detect the presence of a video signal, but any activity on the line. In some situations, for example during setup of channels of the VCR when a television is used to check when the VCR is correctly tuned, only a noise signal is transmitted by the VCR to the television while a channel has not been found. Detection circuitry 386 is arranged to detect the presence of such a noise signal so that loop through can be activated and the noise displayed on the television.

Circuitry 386 comprises a filter 404 connected to input 402 which is a high pass filter, and removes the DC components of the video signals. High pass filter 404 comprises a capacitor 406 connected between the input node 402 and a node 408, and a resistor 410 connected between node 408 and a voltage reference, which in this example is set at 3 volts. The signal at node 408 provides the filtered video signal at the output of the high pass filter, and is labelled FVID. Filter 404, and in particular the signal FVID 408 from filter 404, is connected to a comparator circuit 412, which comprises a comparator 414. Comparator 414 is for example an operational amplifier, and comprises positive and negative differential inputs, the positive input being connected to node 408. The negative input of comparator 414 is connected to a voltage equal to the voltage reference plus an offset $V_m$ which is for example equal to approximately 50 mV.

The output of comparator 414 is connected to a monostable block 418 of the detection circuitry. Block 418 detects for activity in the video line input at given time intervals, and comprises an AND gate 420 having two inputs, a first input which is connected to the output 415 of comparator 414, and a second input which is connected to the output of an inverter 422. The output of AND gate 420 is connected to the S input of an RS flip-flop 424. The complementary output $\overline{Q}$ of the RS flip-flop 424 is connected to a node 426, which is further connected to the control node of a transistor 428. Transistor 428 is, for example, a MOS transistor and has its main current terminals connected between ground and a further node 430. Node 430 is connected to a current source 432, providing a current of Ia. Node 430 is also connected to a capacitor 434 connected between node 430 and ground, and to the positive input of a comparator 436. Comparator 436 is, for example, an operational amplifier, and comprises positive and negative differential inputs. The negative input terminal of comparator 436 is connected to a second voltage reference $V_{ref2}$, which in this example is equal to 3 volts. The output of comparator 436 is connected to the R input of RS flip-flop 424, which is also connected to the input node of inverter 422.

The output node 426 of RS flip-flop 424 is connected to a further circuit block 440, and in particular to a control node of a current mirror 442 allowing the current passing through the current mirror to be regulated. Current mirror 442 is connected between ground and a node 444. Node 444 is also connected to one terminal of a capacitor 446, the other terminal of which is connected to ground, to a current source 448 connected between $V_{cc}$ and node 444, which provides a current Ic, and to the negative input terminal of a comparator 450. Comparator 450 is for example an operational amplifier having positive and negative differential input terminals. The positive input terminal of comparator 450 is connected to a switch 452 allowing this node to be connected to one of two threshold voltages $V_{TH1}$ and $V_{TH2}$. Switch 452 is controlled by the output of comparator 450, which also provides the output of the detection circuitry, labelled DET, at an output node 454.

Operation of the detection circuit 386 will now be described with reference to a timing diagram of FIG. 5.

Figure 5:
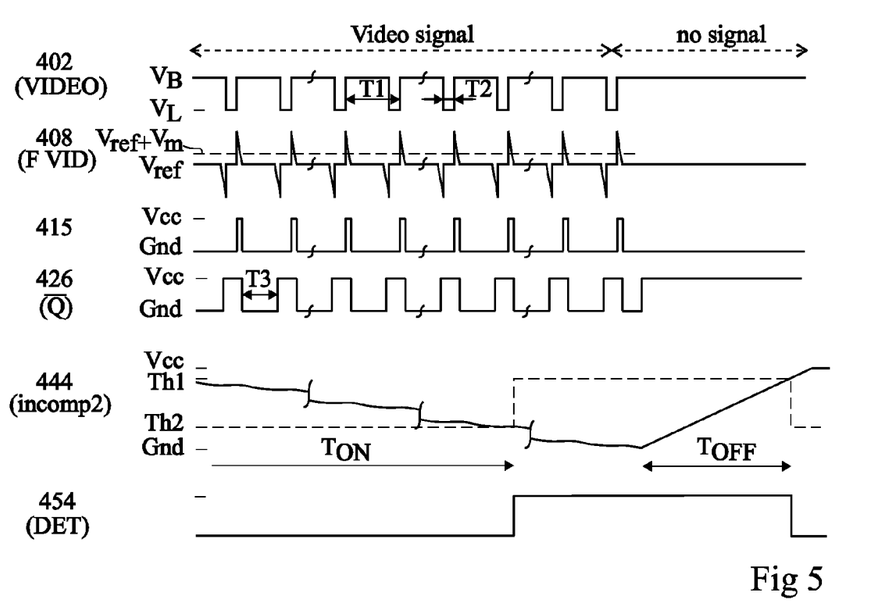
FIG. 5 is a timing diagram corresponding to the video detection cell of FIG. 4.

The first waveform shown in FIG. 5 illustrates the video signal at input node 402. The example has been shown for the case that the video signal is black. The waveform in this example comprises a square wave having a high level at a voltage $V_B$ corresponding to black. In alternative signals this portion of the signal would be used for transmitting the color information for each video line. The waveform also comprises low pulses which drop to a voltage $V_L$, these pulses providing the line synchronization. Thus, the period of the square wave, labelled Ti, is equal to the period of a video line, and in this example is for example 64 μs, while the width of a low pulse, labelled T2, is for example equal to 4.7 μs.

The next waveform in FIG. 5 shows the output FVID of high pass filter 404 at node 408. As illustrated, when the video signal is high, FVID is equal to $V_{ref}$, which is the voltage at node 408 connected to resistor 410 of the high pass filter 404. This is, for example, equal to 3 volts. On the falling edge of the video signal, the signal FVID at node 408 has a downward spike. On the rising edge of the video signal on line 402, FVID has an upward spike. The dashed-line labelled Vref+ Vm drawn over the waveform for FVID corresponds to the voltage at the negative node of the comparator, and is higher than Vref, but lower than the peak of the upward spike in FVid caused by the rising edge of the video signal.

Comparator 414 compares the inputs at its negative and positive input nodes, and provides a high output when the positive input is higher than the negative input. This is the case whenever there is an upward spike in the voltage on node 408, and thus as shown, the voltage at the output of comparator 414 at node 415 has a number of square pulses corresponding to each upward spike of FVID.

The next waveform shows the output $\overline{Q}$ of the RS flip-flop 424 at node 426. The default state of this monostable circuit 418 is that the $\overline{Q}$ output of RS flip-flop 424 at node 426 is high, and therefore transistor 428 is active and conducts current Ia to ground. This means that the voltage at node 430 is low, causing output of comparator 436 to be low, and the output of inverter 422 to be high.

When a high signal is provided on node 415, the output of AND gate 420 thus goes high. This in turn causes the $\overline{Q}$ output of RS flip-flop 424 to go low, which turns off transistor 428. Thus current Ia no longer passes through transistor 428, but instead charges capacitor 434, causing the voltage at node 430 to rise. Eventually the voltage at node 430 will have risen to a value higher than the voltage at the negative node of comparator 436, which in this example is equal to 3V, and comparator 436 then provides a high output. This high output resets RS flip-flop 434 as well as providing a low signal at the output of inverter 422, and thereby causing the output of AND gate 420 to go low. The output at node 426 of the RS flip-flop will thus go high, turning on transistor 428, and hereby discharging capacitor 434. This process will be repeated when the next positive pulse on line 415 arrives.

Monostable circuit 418 thus provides a delay between sensing the arrival of a first pulse, and when the circuit will be allowed to sense the arrival of a second pulse. The delay is determined by capacitor 434, which in this example has a capacitance of 5 pF, which corresponds to a delay of less than 64 μs, and for example a delay of between 50 and 90 percent of one period of the input signal on line 402. Thus, after receiving the spike caused by the synchronization pulse for one line, the circuit will wait for a certain period before it is ready to receive the next line synchronization pulse. Any high pulses received in the meantime will not change the state of the RS flip-flop 424.

As illustrated in FIG. 5, the $\overline{Q}$ output of RS flip-flop 424 at node 426 is high for a period of time before a positive pulse at node 415, but then goes low for the period of time T3 after the arrival of the positive pulse, before going high again. Each time the signal 426 is low, this causes current source 442 of block 440 to conduct current, and in particular to conduct a current $I_D$ which is greater than current $I_C$ and which discharges a charge stored on capacitor 446. The ratio between the time that output $\overline{Q}$ at node 426 is high and low, and the values of currents $I_C$ and $I_D$ therefore determine the overall rate at which capacitor 446 discharges. In particular, currents $I_D$ and $I_C$ can be regulated such that while the video signal at input 402 is active, capacitor 446 slowly discharges, and after a certain time, the voltage at node 444 at the negative input terminal of comparator 450 is sufficiently low that the output at node 454 becomes high.

For example, these parameters can be chosen to satisfy the following relationship such that capacitor 446 having capacitance $C_2$ discharges, which assumes that current source 442 conducts a current of ID when on, and no current when off:

$$\frac{(I_D - I_C) \cdot T_3}{C_2} > \frac{I_C(T_1 - T_3)}{C_2}$$

$$T_3 > \frac{R}{1+R} \cdot T_1 \text{ with } R = \frac{I_C}{I_D - I_C}$$

As an example, assuming T3 is equal to 48 μs and T1 is equal to 64 μs, then the ratio R must be less than 3. Assuming $I_C$ is equal to 1 μA, this means that $I_D$ must be greater than 1.33 μA.

Thus, as shown in the next waveform of FIG. 5, the voltage at node 444 slowly falls while there is an active video signal. During this time, as the output of comparator 450 at node 454 is low, switch 452 selects the second threshold $V_{Th2}$ as the input of positive terminal of comparator 450. The value of C2 is chosen to ensure that a certain number of low pulses of the signal $\overline{Q}$ at node 426 are required before the voltage at node 444 drops below the second threshold voltage $V_{Th2}$. In the present example, a capacitance of 20 pF for example corresponds to approximately 25 low pulses of $\overline{Q}$, and thus 25 video lines.

After a certain time, the voltage at node 444 drops below the threshold set by $V_{Th2}$, and thus the output of comparator 450 goes high, providing a high output signal at node 454. This has the effect of switching switch 452 such that the first threshold voltage VTh1 is selected to be connected to the positive input of comparator 450. Thus while the video signal is active, the voltage at node 444 will continue to drop, and thus the output at node 454 will stay high. However, when the video signal stops and there is no signal, current source 442 will stop conducting and the current from source 448 will charge the capacitor 446. Thus, after a certain period labelled $T_{off}$ in FIG. 5, capacitor 446 will have sufficient charge to bring the voltage at node 444 above the first threshold $V_{Th1}$, causing the output of comparator 450 to go low. In such a way the loop through functionality can be deactivated shortly after it is determined that there is no more activity on the video line.

As explained above, the detection circuit 386 will also sense noise at the input node 402, provided the noise has sufficient peak voltages, in other words above Vref+Vm. The values of Vref and Vm can be chosen based on the expected noise levels from the VCR.

Figure 6:
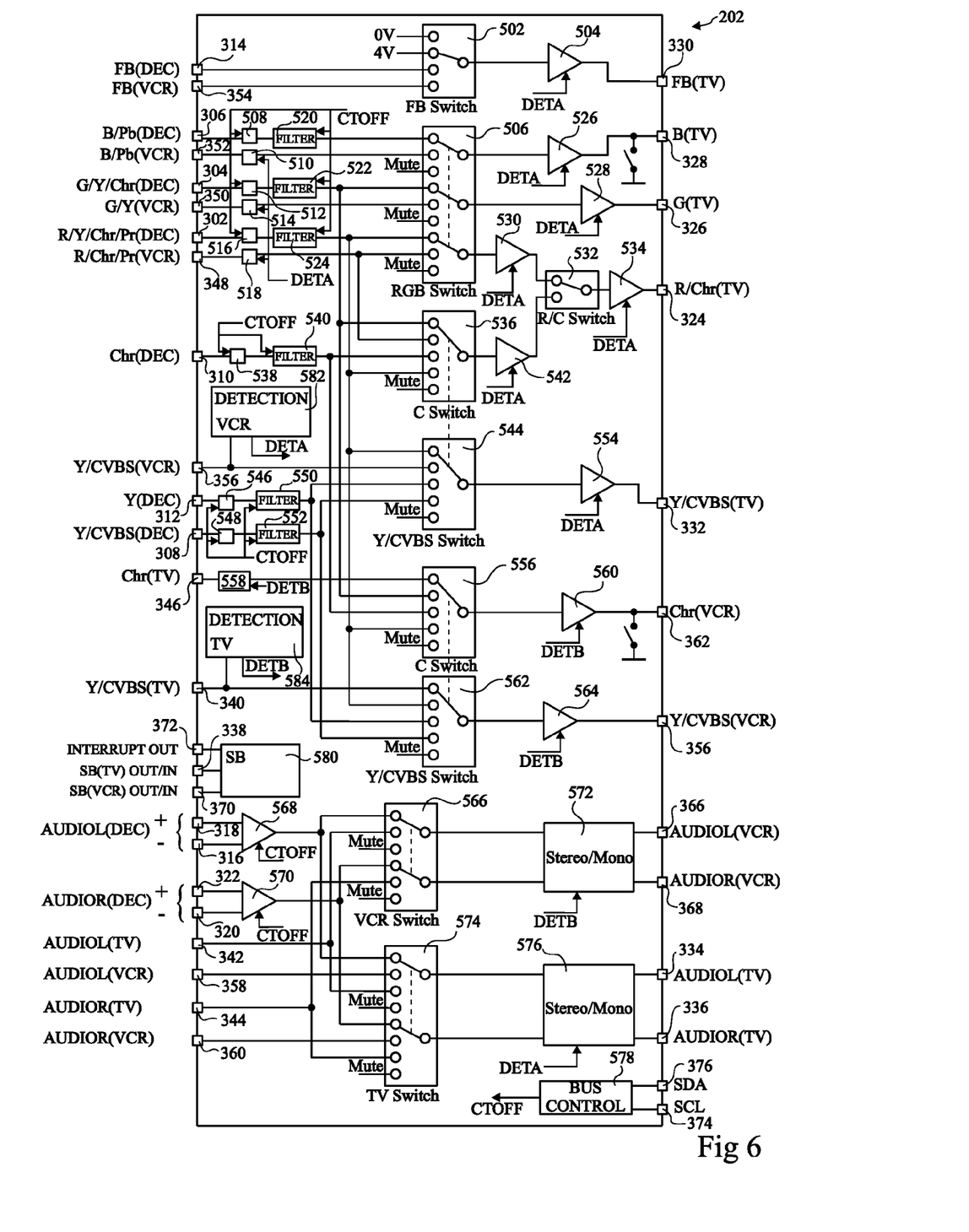
FIG. 6 illustrates schematically the multimedia switch of FIG. 3 in yet more detail.

FIG. 6 illustrates the switch 202 in yet more detail, and in particular illustrates the connections of the detection circuitry 386. In this example two such circuits are provided.

As illustrated in FIG. 6, the inputs to switch 202 correspond to the inputs shown in FIG. 3. In particular, the input and output lines are labelled with the same references as those used for the inputs and outputs in FIG. 3, and these signals will not be described again.

Multimedia switch 202 comprises 8 switches for switching the signals between the inputs and outputs. An output buffer is provided after each switch to buffer the signals before they are output.

As illustrated, a first switch 502 receives the fast blanking signals from the decoder and VCR on lines 314 and 354, respectively, and outputs these to an output buffer 504 which provides a fast blanking output to the television SCART on line 330.

A switch 506 receives the RGB or alternative component signals from the decoder and VCR on lines 306, 352, 304, 350, 302 and 348. Each of these signals is provided to a respective input buffer 508, 510, 512, 514, 516 and 518. The signals from the decoder on lines 306, 304 and 302 are furthermore provided to filters 520, 522 and 524. The outputs from these filters and from the other input buffers 510, 514 and 518 are provided to inputs of switch 506, which selects three of these signals for output. An output buffer 526 is provided for outputting the blue video signal on line 328 to the television SCART. A second output buffer 528 is provided for outputting the green video signal on line 326 to the television SCART. A third output buffer 530 is provided for outputting the red video signal to a further R/C switch 532, which selects either the Red input from buffer 530 or a chroma signal from a chroma switch 536, and provides an output to a further output buffer 534 which provides the red or chroma signal to the television SCART on line 324.

Switch 536 receives all of the inputs having a chroma (C) signal, except inputs originating from the television, for output to the television SCART. This includes the chroma input from the decoder on line 310, which is provided to an input buffer 538 and then filtered by filter 540 before being provided to switch 536. Switch 536 outputs a signal to output buffer 542, which provides a second input to switch 532.

A switch 544 is provided for switching the luminance (Y) and composite video signals to the television SCART. In particular, this switch receives the inputs on line 302 from the decoder, on line 356 from the VCR, on line 312 from the decoder, and on line 308 from the decoder. The signals from lines 312 and 308 are received via input buffers 546 and 548 respectively, and respective filters 550 and 552. One of these inputs to switch 544 is selected for output to buffer 554, which provides an output on line 332 to the television SCART.

A switch 556 is provided for switching the chroma (C) inputs to the chroma output to the VCR SCART on line 362. Switch 556 receives inputs on line 346, line 304, line 310 and line 302. The input on line 346 is provided to an input buffer 558 before being provided to switch 556. One of these inputs is selected by switch 556 to be output to an output buffer 560 before being provided to output line 362 of this VCR SCART.

A switch 562 is provided for switching the composite video inputs to the composite video output of the VCR SCART on line 356. Switch 562 receives inputs on lines 340, 302, 312 and 308. One of these inputs is selected by switch 562 to be provided to output buffer 564 which provides an output to line 356.

A switch 566 is provided for switching the audio inputs to the SCART audio outputs to the VCR. Switch 566 receives the left audio positive and negative inputs on lines 318 and 316 from the decoder, which are provided to an input buffer 568. It also receives the right audio inputs from the decoder on lines 322 and 320 which are provided to an input buffer 570 before being provided to one of the inputs of the switch 566. These blocks also receive the left and right audio signals from the television on lines 342 and 344 and the left and right audio signals from the VCR on lines 358 and 360. One pair of left and right audio signals is selected by switch 566 and output to an output buffer 572 which provides the left and right audio outputs on lines 366 and 368 to the VCR.

Finally, a switch 574 performs a similar function to switch 566, but provides an output signal to the left and right audio outputs to the television. Switch 574 receives the same signals as switch 566 and additionally receives the left and right audio signals from the VCR on lines 358 and 360. One pair of left and right audio signals is output to an output buffer 576 which provides the output signals to the output lines 334 and 336 to the left and right audio outputs of the television SCART.

A bus control block 578 receives the bus data signal SDA on line 376 and the bus clock signal SCL on line 374. Bus control block 578 provides signals to control all of the switches of the switch 202 and can further control each of the input and output buffers.

A slow blanking logic block 580 receives slow blanking inputs from the television and VCR on lines 338 and 370 respectively, and provides an output on either of these lines or the interrupt line 372.

Detection blocks 582 and 584 are provided for detecting activity on the VCR and television composite video line inputs respectively, each block being identical to detection block 386 described above. Detection block 582 outputs a detection signal DETA while detection block 584 outputs a detection signal DETB. These detection signals are generated as described in relation to FIGS. 4 and 5.

Operation of the switch 202 of FIG. 6 will now be described. Before entering a sleep or standby mode, the microprocessor of the set top box sends a signal via lines 376 and 374 to the bus control block 578 of the switch indicating that parts of the switch should be switched off, such that they do not consume power. Bus control logic 578 is controlled to output a signal $CT_{off}$, which deactivates the input buffers associated with all inputs from the decode circuitry, as these inputs will not be required when the set top box is not functional. In particular, the signal $CT_{off}$ is provided to input buffers 508, 512, 516, 538, 546, 548 and the audio input buffers 568 and 570. Furthermore, this signal CT is provided to deactivate the filter circuits which will not be required. In particular, it is provided to filter blocks 520, 522, 524, 540, 550 and 552 which are connected to input lines received from the decoding circuitry. If not already activated, the bus control block 578 also activates the detection blocks 582 and 584.

At the same time, the switches are controlled to be ready for providing loop through between the television and VCR SCARTs. For the switches 502, 506, 536, 544 and 574 that provide signals to the television SCART, this involves selecting the VCR inputs at each switch. For the switches 556, 562 and 566 that provide signals to the VCR SCART, this involves selecting the television inputs at each switch. At the same time, the input and output buffers associated with the television and VCR signals to these switches are put under the control of the detection circuits 582 and 584, which deactivates these buffers while no video activity is detected.

If while the set top box is in standby mode, a video signal or other activity is detected on either the inputs 356 or 340, the associated detection block will sense this activity and output signal DETA or DETB respectively. DETA is active when there is a signal on the video input from the VCR SCART on line 356, and is provided to active output buffers 504, 526, 528, 530, 534, 542, 554 and 576 to the television. At the same time, the input buffers associated with the VCR are also activated, thus the signal DETA is provided to input buffers 510, 514 and 518. The switches associated with the television outputs have already been controlled to be correct for providing the loop through from the VCR to the television, and thus by activating the input and output buffers described above, loop through to the television is activated.

If alternatively or additionally, while in standby mode, a video signal or other form of activity is detected on the television composite video input on line 340, the signal DETB is activated from the detection block 584, and provided to activate the output buffers 560, 564 and 572 to the VCR. At the same time, the chroma input buffer 558 associated with the chroma input on line 346 is activated. The switches associated with the VCR outputs have already been controlled to be correct for providing the loop through from the television to the VCR, and thus by activating the input and output buffers described above, loop through to the VCR is activated.

According to alternative embodiments of the present invention, the slow blanking signal SB may also be used to activate the loop through functionality. For example, according to one embodiment, the SB input associated with the VCR on line 370 could also be connected to the input of detection block 582 so that the output DETA is activated when activity is sensed on either the CVBS input line 356 or the SB input line 370. Furthermore, the SB input associated with the television on line 338 could also be connected to the input of detection block 584 so that the output DETB is activated when activity is sensed on either the CVBS input line 340 or the SB input line 338.

Thus a switch for a set top box has been described that advantageously provides loop through functionality when activity is detected on an input video line from a television and/or video player and/or video recorder, and in particular from an interface of the set top box provided for communication with the television or video player/recorder. Loop through can be provided in both directions (television to video recorder or video recorder to television) independently. Loop through is implemented by directly activating switching circuitry in the switch, without activating the processor of the set top box. The switching circuitry may comprise video switches, which for example switch the video and/or audio signals and/or display data signals. In some embodiments, these video switches are configured for loop through by the processor when the low power mode is to be entered, and thus no further control of these switches by the processor is required to implement loop through. Input and/or output buffers in the switching circuitry are preferably switched off when loop through is not active, and are switched on to activate loop through.

The detecting circuit preferably detects for active signals on the video input lines, for example signals having voltage levels above a certain threshold. Preferably, to avoid inadvertently activating loop through, the detection circuitry detects regular active signals received over a determined time period before activating loop through. For example, delay circuitry, for example a monostable circuit, is provided, to introduce a fixed delay after each active signal is detected before a subsequent active signal can be detected, and timing circuitry, for example block 440 of FIG. 4, is provided to only activate loop through if a predetermined number of active signals are received during a given time period.

Having thus described at least one illustrative embodiment of the invention, various alterations, modifications and improvements will readily occur to those skilled in the art. For example, while the examples of SCART interfaces have been provided above, in alternative embodiments the invention could be applied to alternative interfaces, such as co-axial interfaces, or high definition television interfaces. Furthermore, while the composite video inputs are monitored for activity in the embodiments described above, in other embodiments other video inputs could be monitored, such as the luminance (Y) input, chroma (C) input, or any of the RGB inputs.

Whilst examples have been described in which a switch is provided for switching video signals between two SCART interfaces and a decoder, in alternative embodiments further interfaces could be provided for connecting the set top box to other devices, and detection circuitry could be provided on each video input from each device. In this case, loop through may be provided from input lines of one interface to output lines of more than one other interface.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A switch for switching video signals in a set top box, said set top box including decoding circuitry and a processor having a low power mode in which said decoding circuitry is inactive, said switch comprising:
    switching circuitry for switching video signals among a first interface for connecting said set top box to a television, a second interface for connecting said set top box to a video playback device, and decoding circuitry for decoding a video stream, and
    detection circuitry arranged to detect, while said processor is in said low power mode, activity on a video input line of one of said first and second interfaces, and arranged to output an activation signal to said switching circuitry in said switch to activate, while said processor is in said low power mode, a loop through between the first and second interfaces when activity is detected.

2. The switch of claim 1, wherein said detection circuitry is arranged to output said activation signal to activate a loop through from said first interface to said second interface when activity is detected on a video input line of said first interface, and to output said activation signal to activate a loop through from said second interface to said first interface if activity is detected on a video input line of said second interface.

3. The switch of claim 1, wherein said activation signal is coupled to activate at least one input and/or output buffer of said switching circuitry coupled to one of said first and second interfaces.

4. The switch of claim 1, wherein said detection circuitry comprises timing circuitry arranged to provide said activation signal if an active signal is regularly detected on said video input line during a first determined time period.

5. The switch of claim 4, wherein said detection circuitry further comprises delay circuitry arranged to introduce a delay after detection of one active signal on said video input line before a next active signal on said video input line can be detected, wherein said timing circuitry is arranged to provide said activation signal if a determined number of said active signals are received during said first determined time period.

6. A set top box including an integrated circuit comprising:
    decoding circuitry for decoding a digital video stream;
    a first interface for connecting the set top box to a television;
    a second interface for connecting the set top box to a video playback device; and
    the switch of claim 1.

7. A method of activating a loop through between a first interface and a second interface of a set top box, said first interface for connecting said set top box to a television and said second interface for connecting said set top box to a video playback device, said set top box including decoding circuitry for decoding a video stream, the method comprising:

monitoring, when a processor of said set top box is in a low power mode in which said decoding circuitry is inactive, a video input line of said first and second interfaces; and providing an activation signal to switching circuitry of a switch to implement, while said processor is in said low power mode, loop through between said first and second interfaces if activity is detected on said video input line, wherein said switch is for switching video signals among said decoding circuitry and the first and second interfaces.

8. The method of claim 7, wherein said step of providing an activation signal comprises providing an activation signal to implement loop through from said first interface to said second interface if activity is detected on a video input line of said first interface, and providing an activation signal to implement loop through from said second interface to said first interface if activity is detected on a video input line of said second interface.

9. The method of claim 8, wherein activity is detected on said video input line if a voltage level above a determined threshold is detected repeatedly within a determined period of time.

10. The method of claim 8, further comprising, when it is determined that the low power mode is to be entered and prior to entering the low power mode, controlling by said processor video switches in said switching circuitry to be configured for loop through between said first and second interfaces, and activating by said activation signal at least one input and/or output buffer of said switching circuitry to implement said loop through.

11. A signal detector cooperating with a microprocessor and cooperating with a switch, the signal detector coupled to a plurality of electronic devices, the signal detector comprising detection circuitry arranged to detect, while said processor is in a low power mode, video signal activity from at least one of the plurality of electronic devices and arranged to output an activation signal to the switch to activate a loop through between the at least one of the plurality of electronic devices and another of the plurality of electronic devices.

12. The detector of claim 11, wherein said detection circuitry comprises timing circuitry arranged to provide the activation signal if video signal activity is regularly detected from the at least one of the plurality of electronic devices during a first determined time period.

13. The detector of claim 12, wherein said detection circuitry further comprises delay circuitry arranged to introduce a delay after detection of one active video signal from the at least one of the plurality of electronic devices before a next active video signal from the at least one of the plurality of electronic devices can be detected, wherein said timing circuitry is arranged to provide said activation signal if a determined number of said active video signals are received during said first determined time period.

14. The detector of claim 11, in combination with a set top box, wherein one of the plurality of electronic devices comprises a television and another of the plurality of electronic devices comprises a video playback device, the set top box comprising an integrated circuit comprising:

decoding circuitry for decoding a digital video stream;

a first interface for connecting the set top box to a television;

a second interface for connecting the set top box to a video playback device; and the signal detector.

15. An apparatus for activating a loop through between a first interface and a second interface of a set top box, said first interface for connecting said set top box to a television and said second interface for connecting said set top box to a video playback device, said set top box including decoding circuitry for decoding a video stream, the apparatus comprising:

a switch for switching video signals between said decoding circuitry and the first and second interfaces;

a means for monitoring, when a processor of said set top box is in a low power mode in which said decoding circuitry is inactive, a video input line of said first and second interfaces; and a means for providing an activation signal to switching circuitry of said switch to implement, while said processor is in said low power mode, loop through between said first and second interfaces if activity is detected on said video input line.

16. The apparatus of claim 15, wherein the means for providing an activation signal comprises a means for providing an activation signal to implement loop through from said first interface to said second interface if activity is detected on a video input line of said first interface, and providing an activation signal to implement loop through from said second interface to said first interface if activity is detected on a video input line of said second interface.

17. The apparatus of claim 16, further comprising a voltage level detection means, wherein activity is detected on said video input line if the voltage level detection means detects a voltage level above a determined threshold is detected repeatedly within a determined period of time.

18. The method of claim 16, further comprising, when it is determined that the low power mode is to be entered and prior to entering the low power mode, a controller means for controlling video switches in said switching circuitry to be configured for loop through between said first and second interfaces, and an activator means for activating by said activation signal at least one input and/or output buffer of said switching circuitry to implement said loop through.

19. An apparatus configured to be connected to a television set and a video playback device, the apparatus comprising a controller adapted to determine whether a loop through is required by sensing a presence of video signal activity on a video input line of a television input connector or a video playback device connector, with the controller rendering whether a loop through is required without reliance on a slow blanking signal.

20. The switch of claim 1, wherein said activity on said video input line comprises video signal activity.

21. The method of claim 7, wherein said activity comprises video signal activity.

22. The signal detector of claim 11, wherein
said switch is configured to switch video signals among decoding circuitry, the at least one of the plurality of electronic devices, and the another of the plurality of electronic devices, and
the loop through is activated while said processor is in said low power mode.

23. The apparatus of claim 15, wherein said activity comprises video signal activity.

24. The apparatus of claim 19, wherein said controller is adapted to activate a switch to implement a loop through between the television input connector and the video playback device connector while a processor of said apparatus is in a low power mode, and to switch video signals among decoding circuitry, the television input connector, and the video playback device connector.

* * * * *